(12) United States Patent
Huang

(10) Patent No.: US 7,438,572 B1
(45) Date of Patent: Oct. 21, 2008

(54) CARD CONNECTOR

(75) Inventor: Kuo Hua Huang, Taoyuan (TW)

(73) Assignee: P-Two Industries, Inc., Taoyuan (TW)

( * ) Notice: Subject to any disclaimer, the term of this patent is extended or adjusted under 35 U.S.C. 154(b) by 0 days.

(21) Appl. No.: 12/007,060

(22) Filed: Jan. 7, 2008

(30) Foreign Application Priority Data

Apr. 27, 2007 (TW) .............................. 96206771 U

(51) Int. Cl.
*H01R 13/62* (2006.01)
(52) U.S. Cl. .................................................... 439/159
(58) Field of Classification Search ................. 439/159, 439/160
See application file for complete search history.

(56) References Cited

U.S. PATENT DOCUMENTS

2001/0055897 A1* 12/2001 Nogami ....................... 439/159

* cited by examiner

*Primary Examiner*—Tho D Ta

(74) *Attorney, Agent, or Firm*—Rosenberg, Klein & Lee

(57) ABSTRACT

An electrical connector has an insulative housing, a plurality of conductive terminals received in the insulative housing, and an ejecting device. The insulative housing defines a slot for receiving an electrical card, and a groove at a side thereof. The ejecting device is assembled to and slidable along the groove. The ejecting device includes a push block, a guiding lever and a spring element. The push block forms a resilient arm which is lockable with a card hole of the electrical card. A rib is formed in the groove. When the electrical card moves along the groove of the insulative housing and is located on a final position, the resilient arm abuts against a top of the rib for preventing the resilient arm from moving downward. In such a way the electrical card is prevented from breaking off during movement and at a final position, ensuring reliable and stable data transmission.

8 Claims, 7 Drawing Sheets

US 7,438,572 B1

CARD CONNECTOR

BACKGROUND OF THE INVENTION

1. Field of the Invention

The present invention relates to a card connector, and particularly, to a card connector which has an ejecting device operated easily.

2. Related Art

A memory card is a kind of portable electronic product, and is popularly used among computer peripherals to store data in electronic products, such as digital camera, PDA, mobile phone and etc. A card connector is generally connected to an electrical card for accessing data in the electrical card. In fact, a card connector is one of essential computer peripherals.

A card connector normally includes an ejecting device for free insertion and ejection of an electrical card. Such a conventional card connector typically comprises an insulative housing, a plurality of terminals received in the insulative housing, and an ejecting device for ejecting the electrical card from the insulative housing. The ejecting device has a sliding block which is slidable on the insulative housing, a spring for providing resiliency of returning, and a following portion for connecting the sliding block and the insulative housing. The sliding block keeps a certain distance away from the insulative housing, obviating resistant force during sliding of the sliding block. Nevertheless, the sliding block tends to rock during its movement, making the electrical card break off, correspondingly, resulting in halting data transmission and losing data.

A card connector overcoming the drawbacks is desired.

SUMMARY OF THE INVENTION

An object of the present invention is to provide a card connector which has an ejecting device operated smoothly and stably and which prevents an electrical card from being ejected uncontrollably.

Another object of the present invention is to provide a card connector which retains an electrical card reliably and prevents the electrical card from breaking off.

To achieve the above objects, the electrical connector according to the present invention comprises an insulative housing, a plurality of conductive terminals received in the insulative housing, and an ejecting device. The insulative housing defines a slot for receiving an electrical card, and a groove at a side thereof. The ejecting device is assembled to and slidable along the groove of the insulative housing. The ejecting device includes a push block, a guiding lever and a spring element. The push block forms a resilient arm which is lockable with a card hole of the electrical card. A rib is formed on the groove of the insulative housing. When the electrical card moves along the groove of the insulative housing and is located at a final position, the resilient arm abuts against a top of the rib, hindering the resilient arm from moving downward, thereby preventing the electrical card from breaking off during movement and at a final position.

DESCRIPTION OF THE PREFERRED EMBODIMENTS

Figure 1:
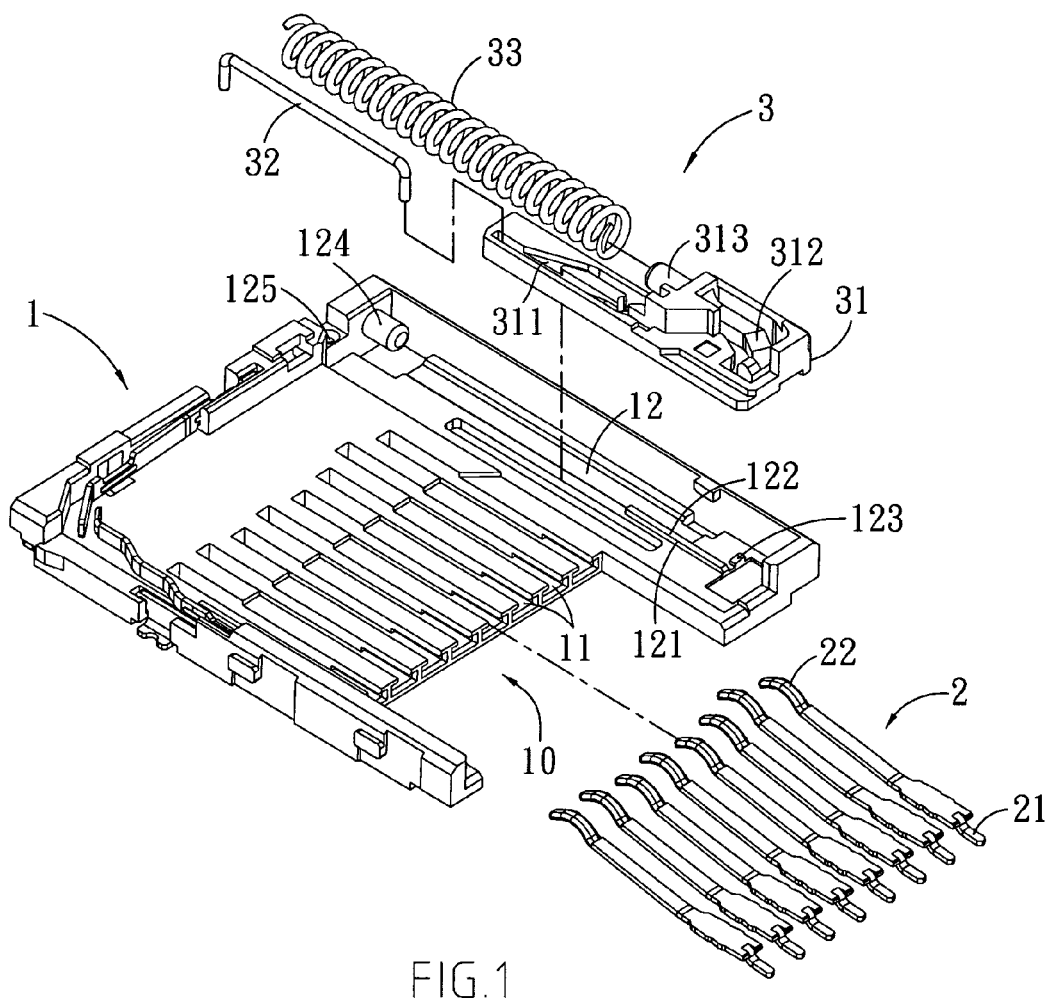
FIG. 1 is an exploded view of a card connector according to the present invention.
Figure 2:
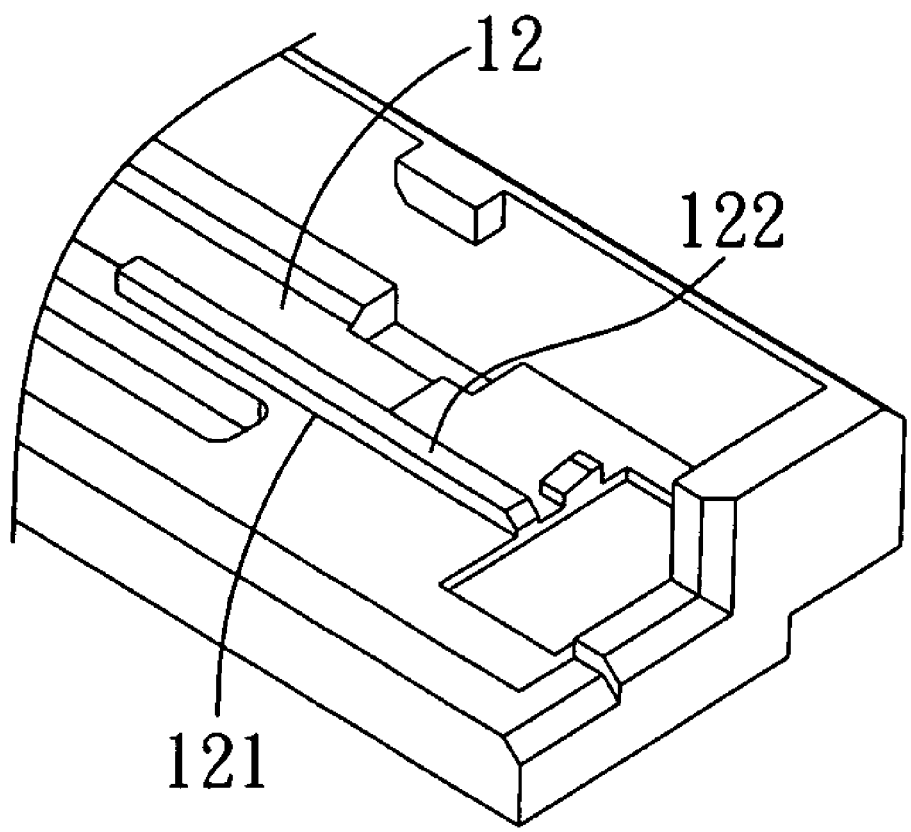
FIG. 2 is a partially enlarged view of an insulative housing of the card connector of FIG. 1.
Figure 3:
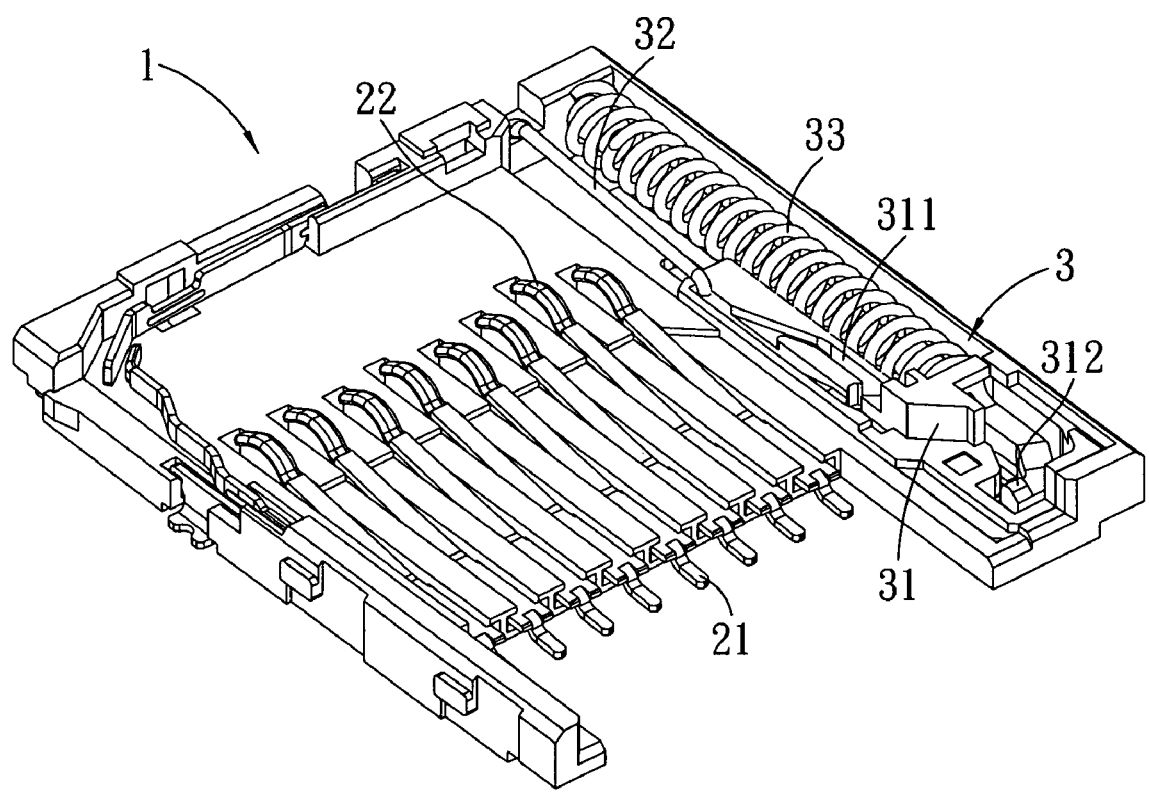
FIG. 3 is an assembled view of the card connector of FIG. 1.

A card connector of the present invention is clearly shown in FIGS. 1, 2 and 3, which comprises an insulative housing 1, a plurality of conductive terminals 2 received in the insulative housing 1, and an ejecting device 3 assembled on and slidable along the insulative housing 1.

Figure 4:
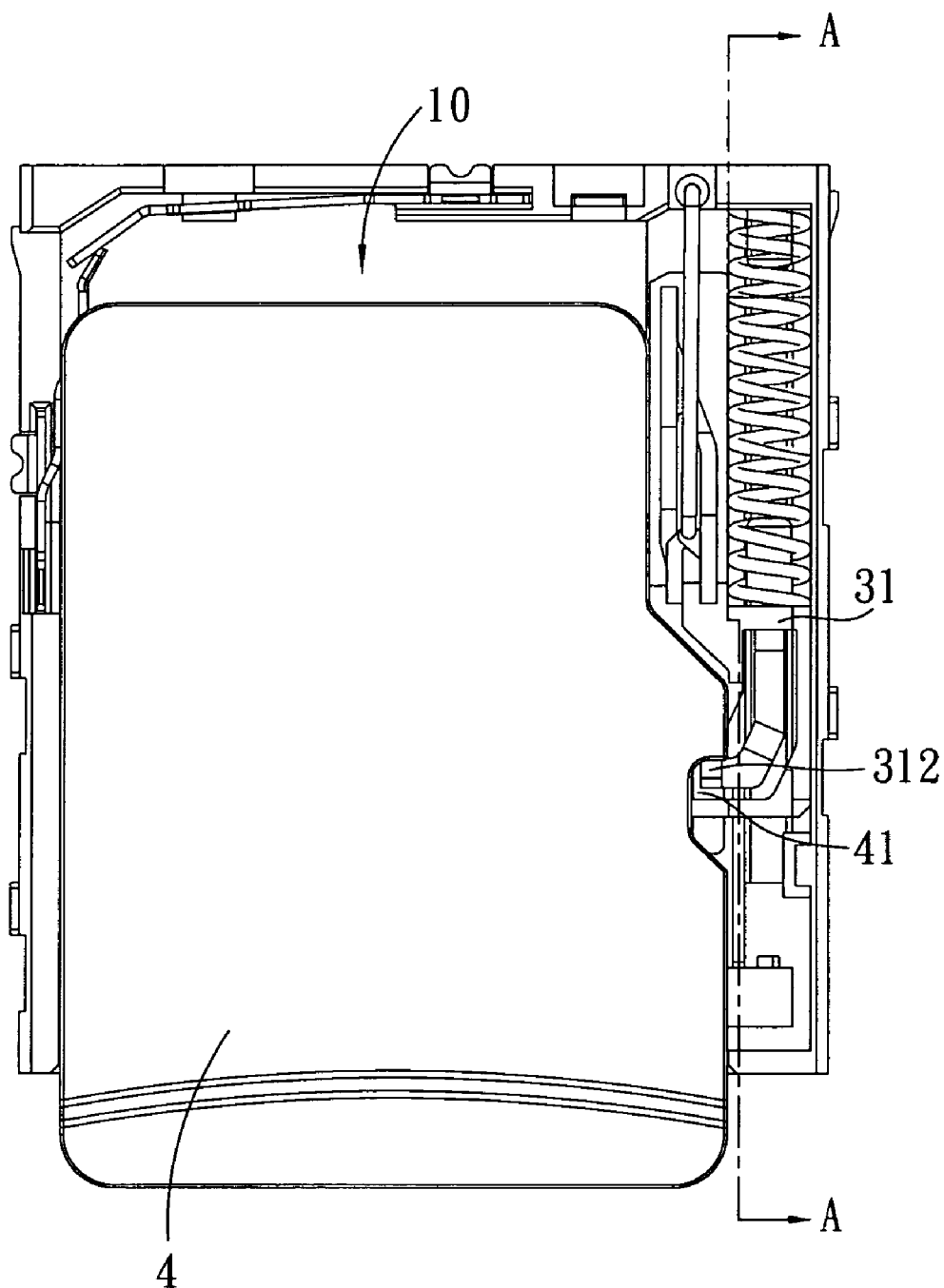
FIG. 4 is a top view of the card connector with an electrical card inserted therein.

The insulative housing 1 is made of plastic and insulating material and is generally shaped of a flat frame. The insulative housing 1 defines a slot 10 substantially in a center thereof. An opening (not labeled) is defined in a front of the slot 10, allowing an electrical card 4 (shown in FIG. 4) to be inserted therefrom. A plurality of passageways 11 is defined in the insulative housing 1 for receiving the conductive terminals 2. An elongated groove 12 is defined in a side of the passageways 11. A rib 121 protrudes substantially from a center of a front of the groove 12 and extends into the groove 12. The rib 121 forms an inclined guiding slope 122 at a top thereof. A rear of the guiding slope 122 is substantially higher than a front thereof. A projection 123 is formed on an outward side of the rib 121. A post 124 is formed on a rear end of the groove 12. A recess 125 is defined adjacent to the post 124. A shell (not shown) is provided to shield a top of the insulative housing 1 for preventing against EMI.

The terminals 2 are made of conductive resilient metal material, and are received in the passageways 11 of the insulative housing 1. Each terminal 2 has a soldering portion 21 bent at an end thereof, and a contact portion 22 at another end thereof and bent upward to extend into the slot 10.

The ejecting device 3 is mounted on the groove 12, and includes a push block 31, a guiding lever 32 and a spring element 33. The push block 31 is mounted above the rib 121 of the groove 12, and defines a trace slit 311. In assembly, a front end of the guiding lever 32 is inserted in and is sliable in the trace slit 31 for insertion and ejection of an electrical card. A rear end of the guiding lever 32 locks with the recess 125 of the insulative housing 1. A cantilevered resilient arm 312 is unitarily formed on a substantial front of the push block 31. The resilient arm 312 is movable slightly upward and downward. A tail 313 extends rearward from a rear end of the resilient arm 312 for anchoring a front end of the spring element 33. A rear end of the spring element 33 latches the post 124 of the insulative housing 1. Thus the ejecting device 3 is firmly mounted on the groove 12.

Figure 5:
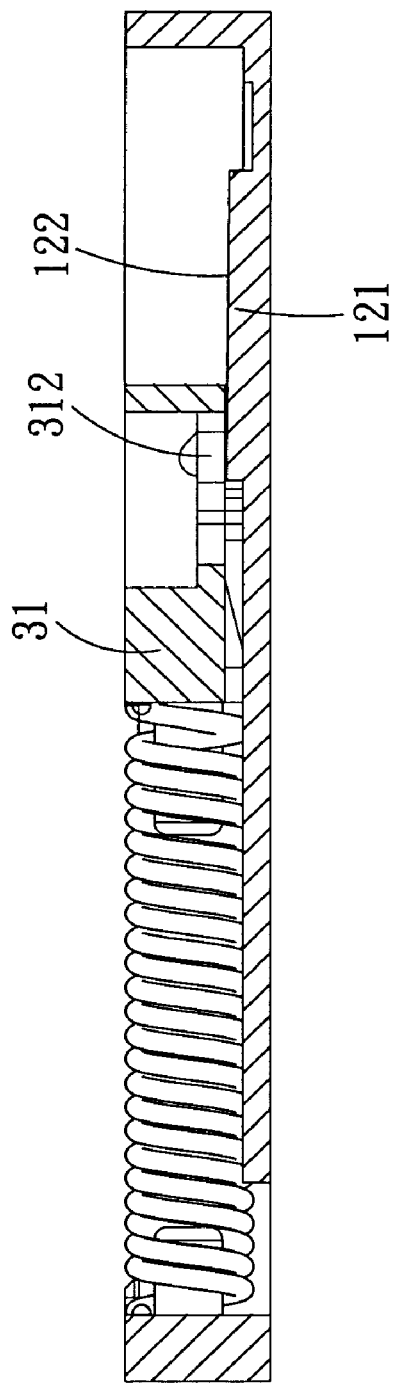
FIG. 5 is a cross-sectional view taken along the line 5-5 of FIG. 4.
Figure 7:
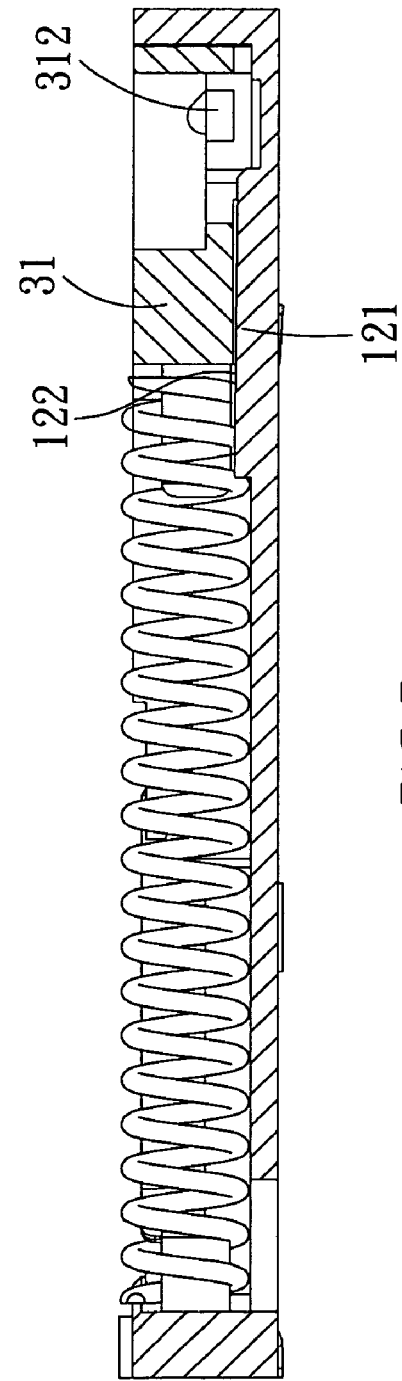
FIG. 7 is a cross-sectional view taken along the line 7-7 of FIG. 6.
Figure 6:
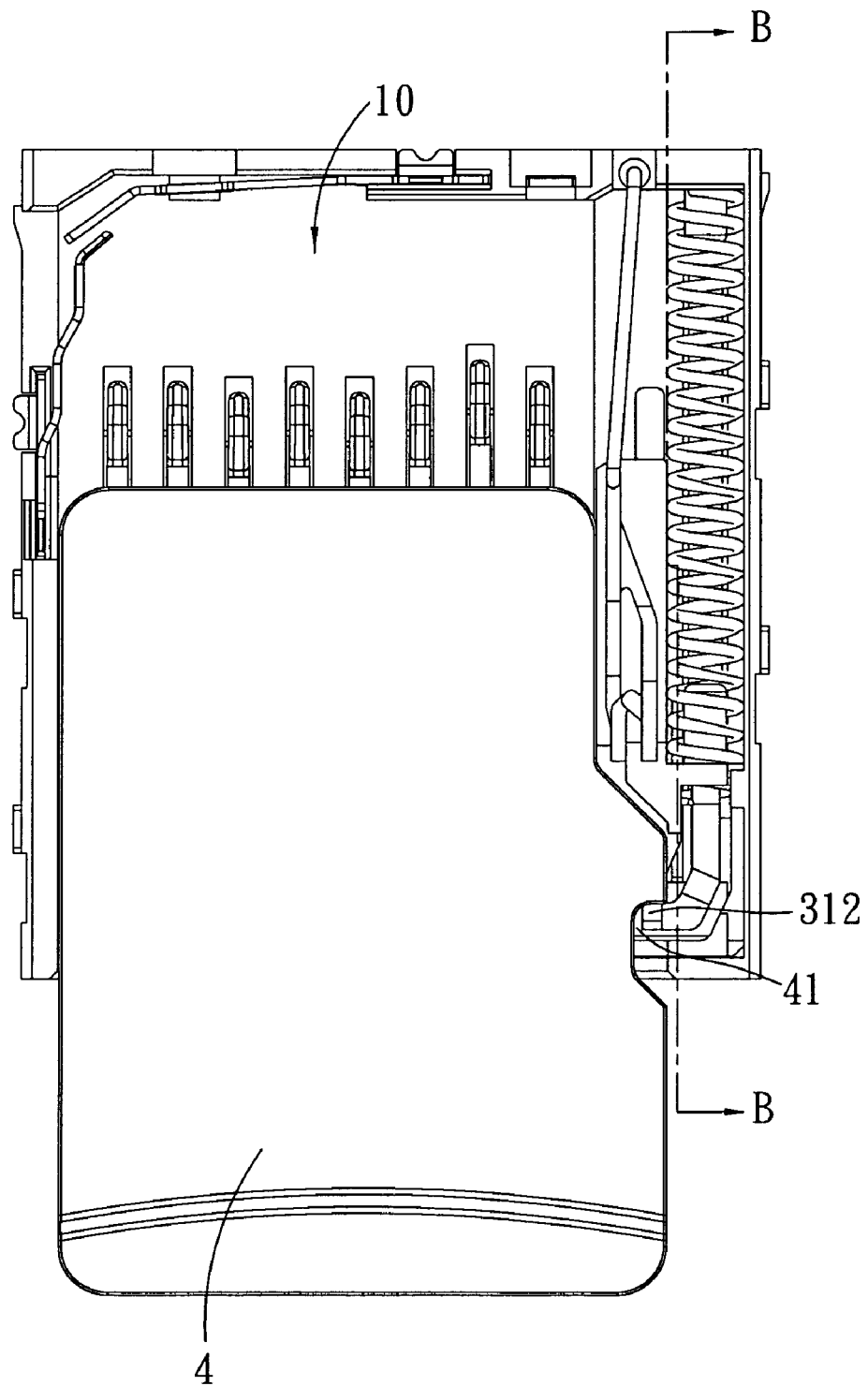
FIG. 6 is a top view of the card connector with an electrical card ejected therefrom.

Please see FIGS. 4, 5, 6 and 7, an electrical card 4, for example a MicroSD card in one embodiment, is inserted from the opening into the slot 10. A free end of the resilient arm 312 biases against a card hole 41 of the electrical card 4. During insertion, the electrical card 4 takes the push block 31 to move until the electrical card 4 is inserted to a final position and forms an electrical connection with the terminals 2. As shown in FIG. 5, the resilient arm 312 abuts against a top of the rib 121, eliminating risk of the electrical card 4 breaking off even if suffering from external impact. The guiding slope 122 on a top of the rib 121 makes the push block 31 slide smoothly. During ejection of the electrical card 4, the push block 31 is ejected stably owing to the rib 121. During ejection, the resilient arm 312 still abuts against a top of the rib 121, and therefore abuts the card hole 41 of the electrical card 4, preventing the electrical card 4 from flying off. Referring to FIG. 7, the free end of the resilient arm 312 departs from a top of the rib 121 until the push block 31 moves to a front position. In order to eject the electrical card 4, the resilient arm 312 moves a little downwardly by external force.

Figure 8:
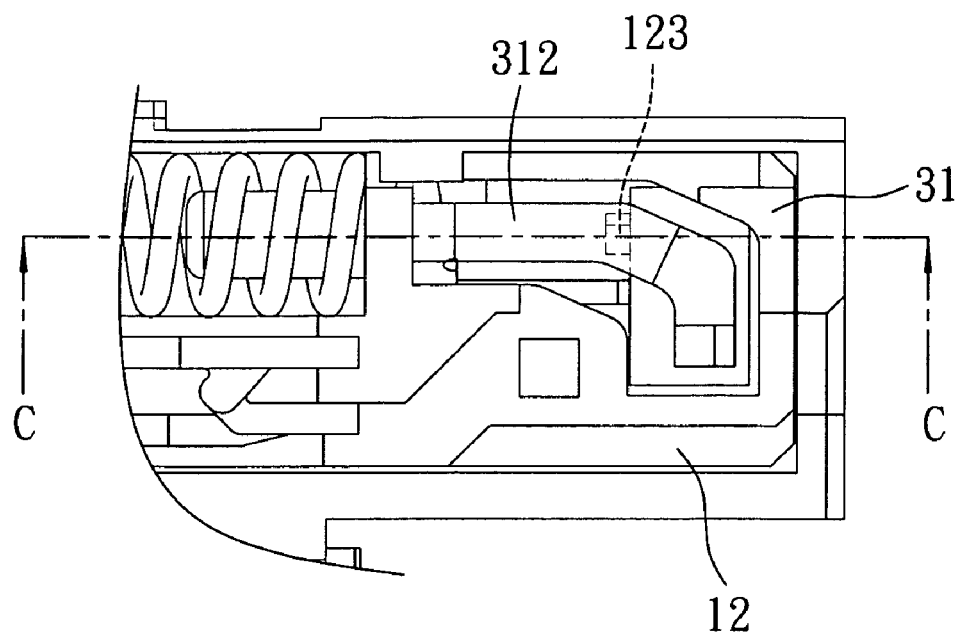
FIG. 8 is a schematically partially top view of the card connector with an electrical card ejected therefrom.
Figure 9:
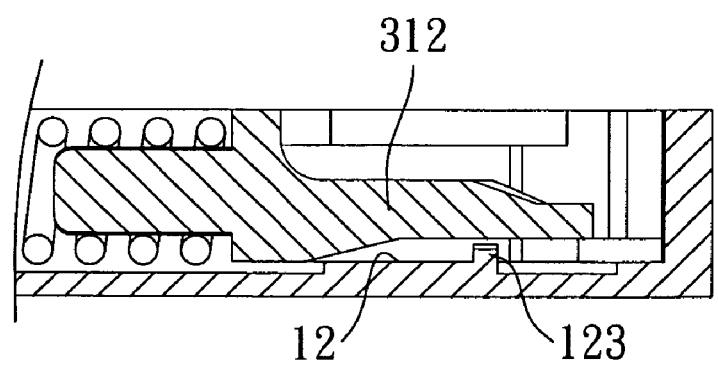
FIG. 9 is a cross-sectional view taken along the line 9-9 of FIG. 8.

Further referring to FIGS. 8 and 9, when the push block 31 moves to a front position, the free end of the resilient arm 312 disengages from the rib 121. A bent portion of the resilient arm 312 abuts against a top of the projection 123, and correspondingly, enabling the resilient arm 312 biasing against the card hole 41 of the electrical card 4 reliably during ejection of the electrical card 4. Therefore, the electrical card 4 is guarded from flying off during ejection. When the resilient arm 312 is pressed downwardly by external force, the resilient arm 312 departs from the card hole 41, ejecting the electrical card 4 out completely.

The rib 121 formed in the groove 12 makes movement of the ejecting device 3 more smooth and stable, and prevents the electrical card 4 from disconnection from a final position. The push block 31 abuts against the projection 123 during ejection of the electrical card 4, preventing the resilient arm 312 from moving downwardly, thereby preventing the electrical card 4 from flying off. The present invention achieves more reliable and stable electrical transmission, and effectively guards against losing data or halting data transmission.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. An electrical connector comprising:
   an insulative housing defining a slot for receiving an electrical card and a groove at a side thereof;
   a plurality of conductive terminals received in the insulative housing;
   an ejecting device assembled to and slidable along the groove of the insulative housing, and including a push block, a guiding lever and a spring element, the push block forming a resilient arm which is lockable with a card hole of the electrical card; and
   a post formed on a rear end of the groove for latching the spring element and a recess being defined adjacent to the post for locking with the guiding lever;
   wherein a rib is formed on the groove of the insulative housing, when the electrical card moves along the groove of the insulative housing and is located at a final position, the resilient arm abutting against a top of the rib, hindering the resilient arm from moving downward, thereby preventing the electrical card from breaking off during movement and at a final position.

2. The electrical connector as recited in claim 1, wherein the rib protrudes substantially from a front of the groove, and forms an inclined guiding slope at a top thereof, a rear of the guiding slope being higher than a front thereof.

3. The electrical connector as recited in claim 1, wherein a projection is formed on an outward side of the rib, the resilient arm abutting against the projection for guarding the electrical card from flying off during ejection.

4. The electrical connector as recited in claim 1, wherein a shell is provided to shield a top of the insulative housing.

5. The electrical connector as recited in claim 1, wherein the insulative housing defines a plurality of passageways, and the terminals are respectively received in the passageways.

6. The electrical connector as recited in claim 1, wherein each terminal has a soldering portion bent at an end thereof, and a contact portion at another end thereof and bent upward to extend into the slot of the electrical card.

7. The electrical connector as recited in claim 1, wherein the resilient arm is unitarily formed on a front of the push block and is cantilevered, a tail extending rearward from a rear end of the resilient arm for anchoring a front end of the spring element.

8. An electrical connector comprising:
   an insulative housing defining a slot for receiving an electrical card and a groove at a side thereof;
   a plurality of conductive terminals received in the insulative housing; and
   an ejecting device assembled to and slidable along the groove of the
   insulative housing, and including a push block, a guiding lever and a spring element, the push block forming a resilient arm which is lockable with a card hole of the electrical card, the push block defining a trace slit, a front end of the guiding lever being inserted into and slidable in the trace slit for insertion and ejection of the electrical cards
   wherein a rib is formed on the groove of the insulative housing, when the electrical card moves along the groove of the insulative housing and is located at a final position, the resilient arm abutting against a top of the rib, hindering the resilient arm from moving downward, thereby preventing the electrical card from breaking off during movement and at a final position.

* * * * *